Aug. 20, 1957 — H. SCHNADT — 2,803,131
PENDULUM-ACTUATED SLOW SPEED IMPACT TESTER
Filed Sept. 19, 1955
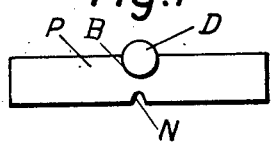
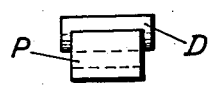
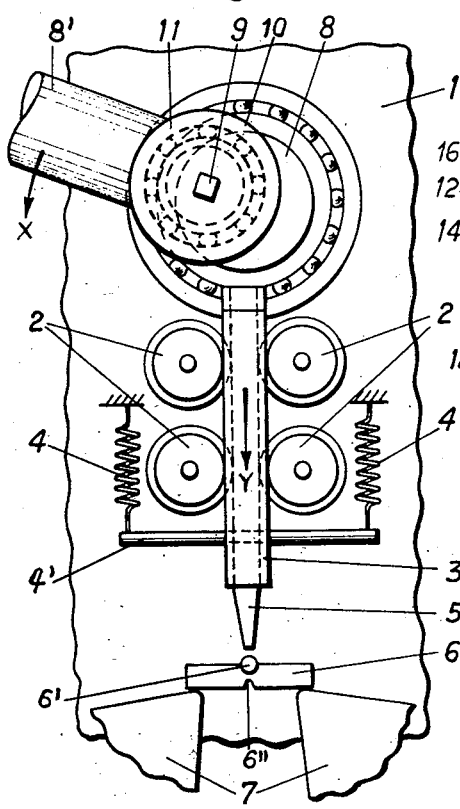
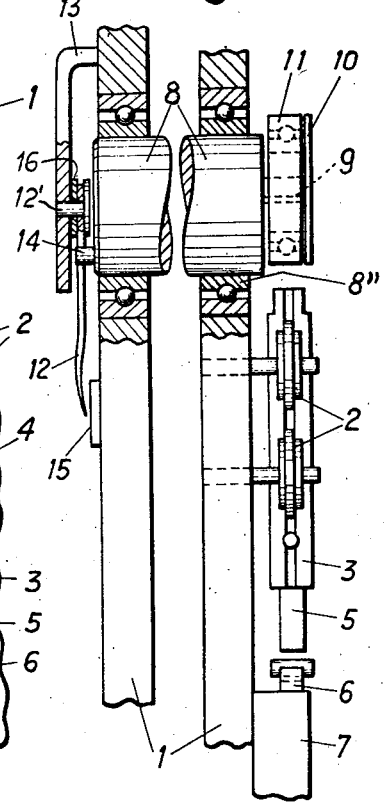
INVENTOR.
HENRI SCHNADT

United States Patent Office 2,803,131
Patented Aug. 20, 1957

2,803,131

PENDULUM-ACTUATED SLOW SPEED IMPACT TESTER

Henri Schnadt, Zug, Switzerland

Application September 19, 1955, Serial No. 535,176

Claims priority, application Switzerland September 23, 1954

3 Claims. (Cl. 73—101)

The present invention relates generally to material testing instruments.

For testing the plastic deformation characteristics of material, especially of metals, under different conditions of tension and temperature, as well as in dependence of these characteristics on chemical composition, thermal treatment, welding effects, cold and hot working, aging, percipitation, and the like, there are mostly employed so-called notch-bar impact tests, for example, in accordance with the systems developed by Charpy, Mesnager, and Izod, or the more recently introduced tests originated by Schnadt.

In carrying out these tests, pendulum impact instruments of known construction are employed in which a pendular system provided with a hammer pane swings in downward direction from a predetermined upper position against the test specimen which may be supported on both sides or only on one side while disposed in the path of movement of the hammer pane to break the specimen in two by means of a single blow and to measure the work or output required to break said specimen. In known pendulum impact instruments, the distance through which the pendulum falls is so chosen that the hammer pane at the time of impact against the specimen has a peripheral velocity of approximately 5 meters per second.

According to Schnadt the test specimen is provided with a bore extending parallel to the impacting hammer pane, in such a manner that the distance between the axis of this bore and that side of the test body or specimen which faces the hammer pane is smaller than one half the diameter of the bore. A bending pin or element is closely fitted into this bore and thus has a portion of its cylindrical surface extending above the test body. It is this very hard and non-deformable pin, which is usually made from a known hard metal composition, which is hit along one of its surface generatrices by the hammer pane.

The bending pin is formed so that both its ends, or at least one of its ends, extend beyond the test body. That side of the test body lying opposite the bending pin is either smooth or provided with a notch or groove running parallel to the axis of the bending pin. If desired, several notches or grooves may be provided.

In order to determine the effect of the speed of deformation, it is desirable to conduct the tests not only with an impact velocity of 5 meters per second usually employed with conventional pendulum-impact devices, but also with bending velocities or speeds the magnitudes of which are considerably smaller, for example, 10 to 100 times less. A speed of 0.1 cm/sec. is preferable. With known pendulum-impact devices this can be obtained only by changing or regulating the distance of fall of the pendulum, i. e., by changing the potential energy of the pendulum. Thus, to decrease the bending velocity by a factor of 10, it becomes also necessary to decrease the distance of fall of the pendulum by a factor of 100, so as to reduce the potential energy by a factor of 100. However, this is unsatisfactory for test purposes, as known pendulum-impact devices do not permit such speed change or reduction.

In accordance with the invention, testing of the above described specimens is carried out with different bending velocities which is made possible due to the fact that the impact device is provided with an attachment or auxiliary member for performing slow speed bending tests. This auxiliary member is so driven or actuated by a pendulum arm or actuator that during the downward swinging movement of the pendulum arm attainment of bending speeds of considerably smaller orders of magnitudes than the peripheral velocity of conventional pendulum hammers is rendered possible, the work or output required for breaking the specimen then being measured by conventional indicating means operatively connected with the device.

It is therefore one of the primary objects of the invention to provide means facilitating the application to test specimens of predetermined bending speeds which are reduced with respect to and do not correspond to the velocity of the pendulum actuator.

It is another important object of the invention to provide means ensuring easy control of the bending speed to thereby perform relatively slow-acting bending tests.

The above and other objects of the invention will become further apparent from the following detailed description, reference being made to the accompanying drawing showing a preferred embodiment of the invention.

In the drawing:

Fig. 1 is a side elevational view of a notched specimen employed in carrying out tests in accordance with the present invention;

Fig. 2 is an end elevational view of specimen of Fig. 1;

Fig. 3 is a schematic front elevational view of a pendulum-actuated impact device for conducting slow speed bending tests on specimens, such as shown in Figs. 1 and 2; and Fig. 4 is a schematic side elevational view, partly in section, of the device of Fig. 3.

Referring now more specifically to Figs 1 and 2, it will be seen that the specimen or test body according to Schnadt generally consists of a bar P, the overall dimensions of which are usually selected in accordance with prescribed standard testing conditions. On the upper surface of the specimen P, i. e. that surface which will face the impact member or hammer pane of the impact instrument during the performance of the test, there is formed a bore B substantially centrally disposed between the ends of the test body or bar. Further arranged in this bore is a pin D made of extremely hard metal so as to be substantially undeformable.

As may be seen from Fig. 1, the bore B is so situated relative to the upper surface of the bar P that the distance between the axis of the bore and said upper surface of the bar P is less than the radium, i. e. one half the diameter, of said bore. As a result, the pin D when closely fitted into the bore B has a portion of its peripheral surface extending above said upper surface. As may further be seen from Fig. 2, the pin D, which is the actual impact receiving member, has both of its ends extending beyond the opposite sides of the bar P to ensure that the stresses due to the impact on the pin D will be distributed over the entire width of the specimen or bar P (Fig. 2).

Formed on the lower surface of the test bar P, i. e. on the surface opposite the bore B, is a notch N which extends substantially parallel to the axis of the bore B. The dimensions of this notch are also chosen in accordance with well known and prescribed standard testing procedures. If desired, however, the notch may be eliminated, so as to have the lower surface of the specimen smooth and even, or more than one notch may be provided.

Turning now to the testing instrument illustrated in Figs. 3 and 4, it will be seen that on a standard or support 1 of the device are supported a plurality of rollers 2 which guide the plunger 3. The latter is retained in its starting or uppermost position by a plurality of springs 4 operatively connected to said plunger by means of a yoke or crossbar 4'. Attached to the lower end of the plunger 3 is an impact member or hammer pane 5.

A specimen 6, which corresponds in all respects to the specimen P illustrated in Figs. 1 and 2, is arranged on and between spaced supports 7 in such a manner that both the pin 6' (D in Fig. 1) and the notch 6" (N in Fig. 1) are disposed substantially centrally between the supports 7. The specimen is so arranged that the axes of said pin and notch extend substantially parallel to the pin-contacting edge of the hammer-like member 5.

An axle 8 of the pendulum arm 8' is rotatably supported in the standard 1 by means of suitable bearings 8" (Fig. 4). Extending from the front end of the axle 8 and disposed eccentrically with respect thereto is a square or rectangular pin or bolt 9. Mounted on the bolt 9 is a plate 10 which supports and retains a suitable roller bearing 11.

When the pendulum arm 8' falls in the direction of the arrow X shown in Fig. 3, the bearing 11 is also rotated so that after a while the outer race or ring of the bearing 11, or an auxiliary ring attached to the outer surface of the outer race, comes in rolling contact with the upper end of the plunger 3. As a result, the plunger 3 is moved downwardly in the direction of the arrow Y and the impact member or pane 5 brought into contact with the pin 6' and therethrough with the specimen 6 at a predetermined speed. The speed of impact of the member 5 against the test body 6 may be varied and depends on the angular velocity of the pendulum, the degree of eccentricity of the bearing 11, as well as on the angle through which the center of the bearing 11 is displaced relative to the longitudinal axis of the pendulum arm 8'.

As may be seen from Fig. 3, the center of the bearing 11 is located directly on the longitudinal axis of the pendulum arm 8'. The above mentioned angle is, therefore, zero.

It will, of course, be realized that the impact velocity may be changed additionally through change of the diameter of the bearing 11. Measurement of the work or energy required to cause breakage of the specimen 6 is accomplished by suitable means for indicating said work or energy in any desired terms or values.

Merely by way of example, the measuring means may be arranged at the rear end of the shaft 8. A portion of the standard or frame 1 is provided with a bracket 13 supporting a pin 12' which carries an indicator or pointer 12 reading over a scale 15 attached to the standard 1 and calibrated in terms of work or energy as mentioned hereinabove. A dog or catch pin 14 engageable with the pointer 12 extends from the rear end of the shaft 8 and is located eccentrically with respect to the axis of the shaft so as to displace the pointer about the axis of its pivot pin and relative to the scale as soon as the shaft 8 is rotated by means of the falling pendulum arm 8'. As in conventionally known instruments of this class, means 16 are provided for frictionally retaining the pointer 12 in any indicating position which it attains during a test operation. From this position, of course, the pointer must be manually returned to its null or starting position prior to the initiation of the next test operation.

It will also be realized that the transmission of the motion of the pendulum arm 8' to the plunger 3, and thus the simultaneous attainment of a slow bending speed, may be effected by other suitable means. Such means, for purposes of transforming rotary motion into linear motion, are well known throughout the machinery field.

It can thus be seen that there has been provided in accordance with this invention a pendulum type impact instrument for performing slow speed building tests on specimens of structural material, comprising means for supporting a specimen of said material adjacent opposite ends thereof, hammer means for applying bending forces to said specimen, means guiding said hammer means for linear movement toward and away from said specimen when the latter is disposed on said supporting means, resilient means operatively connected to said hammer means and biasing the latter away from said specimen, a rotatable axle having its axis of rotation disposed coplanar with the path of movement of said hammer means, a pendulum connected to said axle for swinging movement about said axis of rotation of the latter, rotatable means mounted eccentrically on said axle and having an axis of rotation disposed parallel to said axis of rotation of said axle, said rotatable means being dimensioned to engage said hammer means upon swinging movement of said pendulum in one direction to impart to said hammer means linear movement toward said specimen against the force of said resilient means at a speed of lesser magnitude than the speed of movement of said pendulum, and means responsive to operation of said hammer means for measuring the work required by the latter to bend said specimen.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In an instrument for testing plastic deformation characteristics of materials, which instrument is provided with supports for a specimen of said material and with a pendulum mounted for swinging movement in a vertical plane, force applying means arranged for vertical linear movement in response to said swinging movement of said pendulum toward a specimen of said material retained on said supports, and means for measuring energy expended by said force applying means in deforming said specimen; means for transmitting said movement of said pendulum to said force applying means, and means forming part of said transmitting means for reducing the speed of movement of said force applying means relative to the speed of movement of said pendulum, whereby slow speed bending tests may be carried out by said instrument.

2. In an instrument according to claim 1; said means forming part of said transmitting means comprising a rotatable member having its axis of rotation located eccentrically with respect to the axis of rotation of said pendulum, said rotatable member being engageable with said force applying means upon downward swinging movement of said pendulum to move said force applying means toward said specimen.

3. A pendulum type impact instrument for performing slow speed bending tests on specimens of structural material, comprising means for supporting a specimen of said material adjacent opposite ends thereof, hammer means for applying bending forces to said specimen, means guiding said hammer means for linear movement toward and away from said specimen when the latter is disposed on said supporting means, resilient means operatively connected to said hammer means and biasing the latter away from said specimen, a rotatable axle having its axis of rotation disposed coplanar with the path of movement of said hammer means, a pendulum connected to said axle for swinging movement about said axis of rotation of the latter, rotatable means mounted eccentrically on said axle and having an axis of rotation disposed parallel to said axis of rotation of said axle, said rotatable means being dimensioned to engage said hammer means upon swinging movement of said pendulum in one direction to impart to said hammer means linear movement toward said specimen against the force of said resilient means at a speed of lesser magnitude than the speed of movement of said pendulum, and means responsive to operation of said hammer means for measuring the work required by the latter to bend said specimen.

References Cited in the file of this patent

UNITED STATES PATENTS

| | | |
|---|---|---|
| 2,070,731 | Henning | Feb. 16, 1937 |
| 2,188,898 | Haskell | Feb. 6, 1940 |
| 2,359,044 | MacBride | Sept. 26, 1944 |